W. O. LONG.
HARROW.
APPLICATION FILED DEC. 14, 1918.
1,317,169.
Patented Sept. 30, 1919.
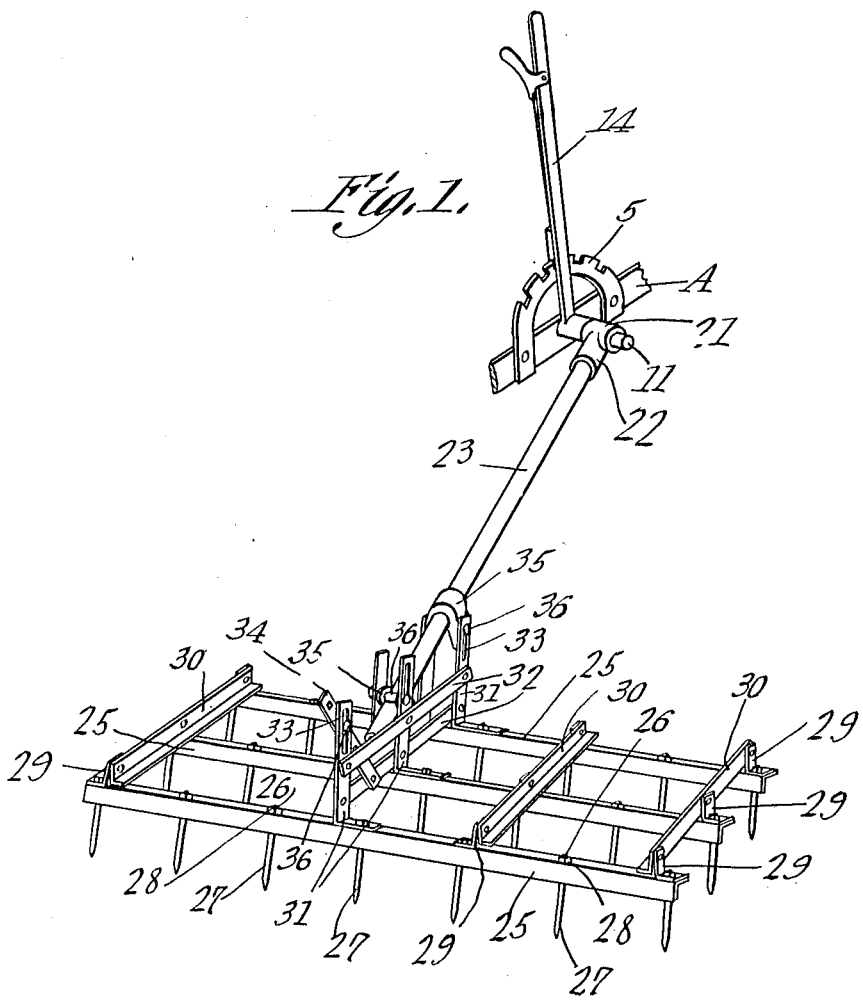
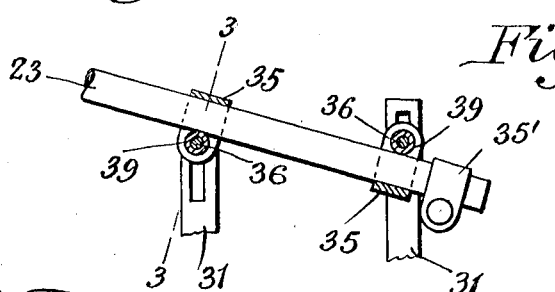
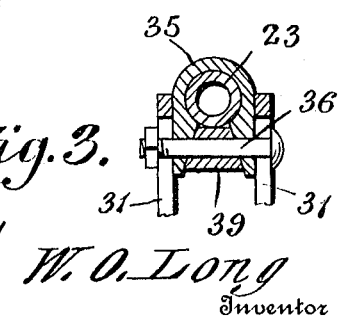
W. O. Long
Inventor

UNITED STATES PATENT OFFICE.

WILLARD O. LONG, OF MANSFIELD, OHIO.

HARROW.

1,317,169.  Specification of Letters Patent.  Patented Sept. 30, 1919.

Original application filed July 8, 1918, Serial No. 243,848. Divided and this application filed December 14, 1918. Serial No. 266,836.

*To all whom it may concern:*

Be it known that I, WILLARD O. LONG, a citizen of the United States, residing at Mansfield, in the county of Richland and State of Ohio, have invented a new and useful Harrow, of which the following is a specification.

This invention relates to harrows and is more especially a division of an application filed by me on July 8th, 1918, Serial Number 243,848.

One of the objects of the invention is to provide a simple and efficient adjustable connection between the harrow and its draw bar or connecting means.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a perspective view of the harrow and its connections.

Fig. 2 is a view partly in section and partly in elevation of the connection between the harrow and its draw bar.

Fig. 3 is a section on line 3—3 of Fig. 2.

Referring to the figures by characters of reference, A designates a portion of a plow structure provided with a short shaft 11 journaled in the lower portion of a segment 5 and adapted to be actuated by a hand lever 14. A sleeve 21 is secured on the shaft 11 and has a tubular extension 22 in which is secured an arm or draw bar 23.

The harrow is adapted to be connected to the lower or rear end of the arm or bar 23 and includes parallel angle strips 25 in which are secured threaded stems 26 projecting from the teeth 27 of the harrow. Nuts 28 engage the stems above and below the strips to form solid connections between the teeth and strips. Certain of the stems are used for securing angle brackets 29 to the strips 25 and these brackets, in turn, are connected by strips 30. The stem of one tooth on each strip 25 can be used to engage the foot of a standard 31 and secure it to the strip. The standards are connected by parallel strips 32 pivotally attached thereto and longitudinal slots 33 are formed in the standards. A brace 34 is connected to one of the strips 32 and is adjustably secured to the slotted portion of the rear standard 31, thus to hold the strips 25 against rotation about their individual longitudinal axes.

U-clamps 35 are interposed between the other standards 31, which are in pairs, as shown, and these clamps embrace the arm or bar 23 and are held thereon by bolts 36 which also serve to secure the clamps adjustably to the standards.

Where the harrow is used with a tractor plow, it is slidably connected to the bar 23. This can be done by placing spacing sleeves 39 on the bolts 36 so as to prevent the clamps 35 from gripping the arm 23. Another clamp 35' without the spacing sleeve can be placed on the rear end portion of the bar 23 and will prevent the arm from sliding forward too far relative to the harrow. When the tractor is backed, however, the arm 23 will slide in the clamps 35 having the spacing sleeves and, if the arm or bar 23 is held against movement, its tendency will be to elevate the harrow during this rearward movement because of its inclination downwardly and rearwardly, as shown. The slidable connection between the parts has been shown in Fig. 2.

What is claimed is:—

1. The combination with a plow structure and a draw bar carried thereby, of a harrow structure connected to the draw bar and shiftable therealong to an elevated position by the backing of the plow structure.

2. The combination with a plow structure, of a harrow structure, and slidably connected means connecting said structures for elevating the harrow structure when the plow structure is backed.

3. The combination with a plow structure, of a harrow structure, means connecting said structures for elevating the harrow structure when the plow structure is backed, and means for shifting said connecting means to elevate the harrow structure independently of the backing movement.

In testimony that I claim the foregoing as my own, I have hereto affixed my signature in the presence of two witnesses.

WILLARD O. LONG.

Witnesses:
E. H. BLANKART,
S. A. STRICKLAND.